United States Patent
Seo et al.

(10) Patent No.: US 12,145,211 B2
(45) Date of Patent: Nov. 19, 2024

(54) ROTARY TOOL, JOINING DEVICE, AND JOINING METHOD

(71) Applicant: NIPPON LIGHT METAL COMPANY, LTD., Tokyo (JP)

(72) Inventors: Nobushiro Seo, Shizuoka (JP); Ryo Yoshida, Shizuoka (JP); Shingo Koizumi, Shizuoka (JP); Keita Oikawa, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 29 days.

(21) Appl. No.: 18/255,798

(22) PCT Filed: Nov. 1, 2021

(86) PCT No.: PCT/JP2021/040287
§ 371 (c)(1),
(2) Date: Jun. 2, 2023

(87) PCT Pub. No.: WO2022/118589
PCT Pub. Date: Jun. 9, 2022

(65) Prior Publication Data
US 2024/0001479 A1    Jan. 4, 2024

(30) Foreign Application Priority Data
Dec. 4, 2020 (JP) ................................. 2020-201869

(51) Int. Cl.
*B23K 20/12* (2006.01)
(52) U.S. Cl.
CPC ...... *B23K 20/1255* (2013.01); *B23K 20/1225* (2013.01); *B23K 20/126* (2013.01)

(58) Field of Classification Search
CPC ................. B23K 20/1255; B23K 20/122–128
(Continued)

(56) References Cited

U.S. PATENT DOCUMENTS

2008/0073409 A1 *  3/2008  Ostersehlte .......... B23K 20/123
                                                              228/2.3
2014/0069985 A1     3/2014  Okada et al.
(Continued)

FOREIGN PATENT DOCUMENTS

CA    2796617 A1 *  5/2013  ............. B23K 20/10
CN    101607352 B *  7/2012  ......... B23K 20/1255
(Continued)

OTHER PUBLICATIONS

International Search Report and Written Opinion for PCT/JP2021/040287 (Jan. 18, 2022).

*Primary Examiner* — Kiley S Stoner
(74) *Attorney, Agent, or Firm* — Merchant & Gould P.C.

(57) ABSTRACT

A rotary tool includes: a main body, and a rotary shaft for transmitting a rotary force; a stirring pin that is arranged on the main body so as to be rotatable by receiving the rotary force and to be movable relative to an axial direction of the rotary shaft, and that is inserted into a joint member to perform friction stirring on the joint member; a shoulder that is formed separately from the stirring pin, that is arranged on the main body so as not to receive the rotary force from the main body but to be movable separately from the stirring pin relative to the axial direction of the rotary shaft, and that presses the joint member while in contact with the joint member; and a first elastic member that biases the stirring pin toward a distal-end side relative to the axial direction of the rotary shaft.

13 Claims, 7 Drawing Sheets

(58) Field of Classification Search
USPC .................................................. 228/112.1, 2.1
See application file for complete search history.

(56) References Cited

U.S. PATENT DOCUMENTS

| | | | | |
|---|---|---|---|---|
| 2018/0056436 A1* | 3/2018 | Thomas | ............... | B23K 20/128 |
| 2018/0056439 A1* | 3/2018 | Thomas | ............... | B23K 20/124 |

FOREIGN PATENT DOCUMENTS

| | | | | | |
|---|---|---|---|---|---|
| CN | 102744514 B | * | 1/2016 | ........... | B23K 20/126 |
| CN | 106670642 A | * | 5/2017 | | |
| CN | 108971743 A | | 12/2018 | | |
| CN | 109570736 A | * | 4/2019 | ......... | B23K 20/1245 |
| CN | 110860783 A | * | 3/2020 | ......... | B23K 20/1245 |
| DE | 202008001344 U1 | * | 5/2008 | ........... | B23K 20/125 |
| EP | 2596898 A1 | * | 5/2013 | ............. | B23K 20/10 |
| JP | 2000-202647 A | | 7/2000 | | |
| JP | 2003-260572 A | | 9/2003 | | |
| JP | 2006297434 A | * | 11/2006 | ........... | B23K 20/125 |
| JP | 2012-196681 A | | 10/2012 | | |
| JP | 2018-176200 A | | 11/2018 | | |
| JP | 6516408 B2 | * | 5/2019 | ........... | B23K 20/126 |
| KR | 20150036616 A | * | 4/2015 | | |
| WO | WO-0128732 A1 | * | 4/2001 | ............. | B23K 20/12 |
| WO | WO-2014024474 A1 | * | 2/2014 | ......... | B23K 20/1245 |
| WO | WO-2016063538 A1 | * | 4/2016 | ............. | B23K 20/12 |
| WO | WO-2019045102 A1 | * | 3/2019 | ............. | B23K 20/122 |
| WO | WO-2019049813 A1 | * | 3/2019 | ............. | B23K 20/002 |
| WO | WO-2019049814 A1 | * | 3/2019 | ......... | B23K 20/1245 |
| WO | WO-2019049892 A1 | * | 3/2019 | ............. | B23K 20/122 |
| WO | WO-2019049894 A1 | * | 3/2019 | ............. | B23K 20/122 |
| WO | WO-2019050002 A1 | * | 3/2019 | ............. | B23K 20/122 |
| WO | WO-2020032141 A1 | * | 2/2020 | | |
| WO | WO-2021060086 A1 | * | 4/2021 | ........... | B23K 20/123 |
| WO | WO-2021241674 A1 | * | 12/2021 | ........... | B23K 20/123 |
| WO | WO-2022080483 A1 | * | 4/2022 | ............. | B23K 20/12 |
| WO | WO-2022118590 A1 | * | 6/2022 | ............. | B23K 20/12 |

* cited by examiner

ROTARY TOOL, JOINING DEVICE, AND JOINING METHOD

This application is a National Stage Application of PCT/JP2021/040287, filed Nov. 1, 2021, which claims benefit of priority to Japanese Application No. 2020-201869, filed Dec. 4, 2020, and which applications are incorporated herein by reference. To the extent appropriate, a claim of priority is made to each of the above disclosed applications.

TECHNICAL FIELD

The present invention relates to a rotary tool, a joining device, and a joining method used for friction stir welding.

BACKGROUND ART

As a joining device for performing friction stir welding, one that carries out load control and one that carries out position control have been known, in order to control the pushing amount of a rotary tool relative to a joint member. The load control is mainly used in a joining device using a robot (robot arm), while the position control is mainly used in a joining device using a machining center (MC).

For example, Patent Literature 1 discloses a joining device that carries out load control. The joining device of Patent Literature 1 controls the depth of press-fitting of a shoulder member or a pin member into a joint object, in order to obtain good joining quality with a suitable precision according to joining conditions. In order to control the press-fitting depth, the joining device controls the position of the pin member relative to the shoulder member based on a press-fitting reference point set by a press-fitting reference point setting unit. The joining device includes a pressure detection unit, a pressure reference point setting unit, a tool drive control unit, and the like to carry out the above control.

CITATION LIST

Patent Literature

Patent Literature 1: JP2012-196681A

SUMMARY OF INVENTION

Technical Problem

The joining device of Patent Literature 1 carries out the load control and thus is complex in structure and expensive. Therefore, the recent demand has been for a rotary tool that can be mounted to a relatively inexpensive MC intended only for position control and that can carry out load control.

In view of the above, it is an object of the present invention to provide a rotary tool, a joining device, and a joining method that can carry out load control while mounted to a machining center.

Solution to Problem

An aspect of the present invention is a rotary tool used in a joining device that performs friction stir welding of a joint member, the rotary tool including: a main body having a fixed unit attached and secured to the joining device, and a rotary shaft for transmitting a rotary force from the joining device; a stirring pin that is arranged on the main body so as to be rotatable by receiving the rotary force from the main body and to be movable relative to an axial direction of the rotary shaft, and that is inserted into the joint member to perform friction stirring on the joint member; a shoulder that is formed separately from the stirring pin, that is arranged on the main body so as not to receive the rotary force from the main body but to be movable separately from the stirring pin relative to an axial direction of the rotary shaft, and that presses the joint member while in contact with the joint member; and a first elastic member that biases the stirring pin toward a distal-end side relative to the axial direction of the rotary shaft.

Preferably, the rotary tool of the present invention further includes a second elastic member that biases the shoulder toward the distal-end side relative to the axial direction of the rotary shaft.

Preferably, in the rotary tool of the present invention, the main body further includes a cylindrical first holder attached to the rotary shaft and a first slide shaft that is housed in a center portion of the first holder so as to be slidable in the axial direction of the rotary shaft and that rotates synchronously with the first holder, the stirring pin is provided at a distal end of the first slide shaft, and the first slide shaft is biased toward the distal-end side of the stirring pin via the first elastic member.

Preferably, in the rotary tool of the present invention, the first elastic member is arranged so as to surround a lower part of the first slide shaft.

Preferably, in the rotary tool of the present invention, the first elastic member is housed inside the first holder and arranged between a base end portion of the first slide shaft and a portion of the first holder on a side of the fixed unit.

Preferably, in the rotary tool of the present invention, a key groove elongated in the axial direction of the rotary shaft is formed on one of the first holder and the first slide shaft, and a key is formed on the other one of the first holder and the first slide shaft so as to extend in a direction intersecting with the axial direction of the rotary shaft and fit into the key groove, the key moves inside the key groove along the axial direction of the rotary shaft as the first slide shaft moves in the axial direction of the rotary shaft, and the key and the key groove come into contact with each other in a circumferential direction as the holder rotates, and thus the holder and the slide shaft rotate synchronously.

Preferably, in the rotary tool of the present invention, the main body further includes a cylindrical second holder provided on an outer circumference of the first holder, and a second slide shaft housed inside the second holder so as to be slidable in the axial direction of the rotary shaft and to rotatably rotate with the second holder, the shoulder is provided at a distal end of the second slide shaft, and the second slide shaft is biased toward the distal-end side of the shoulder via the second elastic member.

Preferably, in the rotary tool of the present invention, the shoulder has a cylindrical shape, and the stirring pin is inserted into the shoulder and protrudes downward from a bottom surface of the shoulder.

Preferably, the rotary tool of the present invention further includes a retainer that retains the shoulder in a non-rotating state.

Preferably, in the rotary tool of the present invention, the first elastic member is an elastic member that imparts elastic force by at least one selected from a solid spring, a fluid spring, magnetic force, and electromagnetic force.

A second aspect of the present invention is a joining device including a rotary tool according to any one of claims 1 to 10, the joining device including a power unit that outputs the rotary force to be transmitted to the rotary shaft of the rotary tool; and a position controller that performs position control of the rotary tool by holding the fixed unit of the rotary tool, in which friction stir welding is performed on the joint member by moving the rotary tool to be in a predetermined height position with respect to the joint member by the position controller and inserting the stirring pin of the rotary tool into the joint member while pressing the shoulder of the rotary tool against the joint member.

Preferably, the joining device of the present invention further includes a second retainer that retains the shoulder in a non-rotating state.

A third aspect of the present invention is a joining method including: performing friction stir welding on the joint member by moving the rotary tool according to any one of claims 1 to 10 to be in a predetermined height position with respect to the joint member and inserting the rotating stirring pin into the joint member while pressing the shoulder against the joint member.

Advantageous Effects of Invention

The rotary tool, the joining device, and the joining method according to the present invention can carry out load control using an elastic member.

DESCRIPTION OF EMBODIMENTS

Hereinafter, embodiments of the present invention will be described with reference to the accompanying drawings. The present invention is not limited only to the following embodiments. Also, some or all of the constituent elements in the embodiments can be combined as appropriate. Further, because the drawings are for conceptually explaining the present invention, dimensions of the respective constituent elements expressed and ratios thereof may be different from actual ones.

1. Rotary Tool

Figure 1:
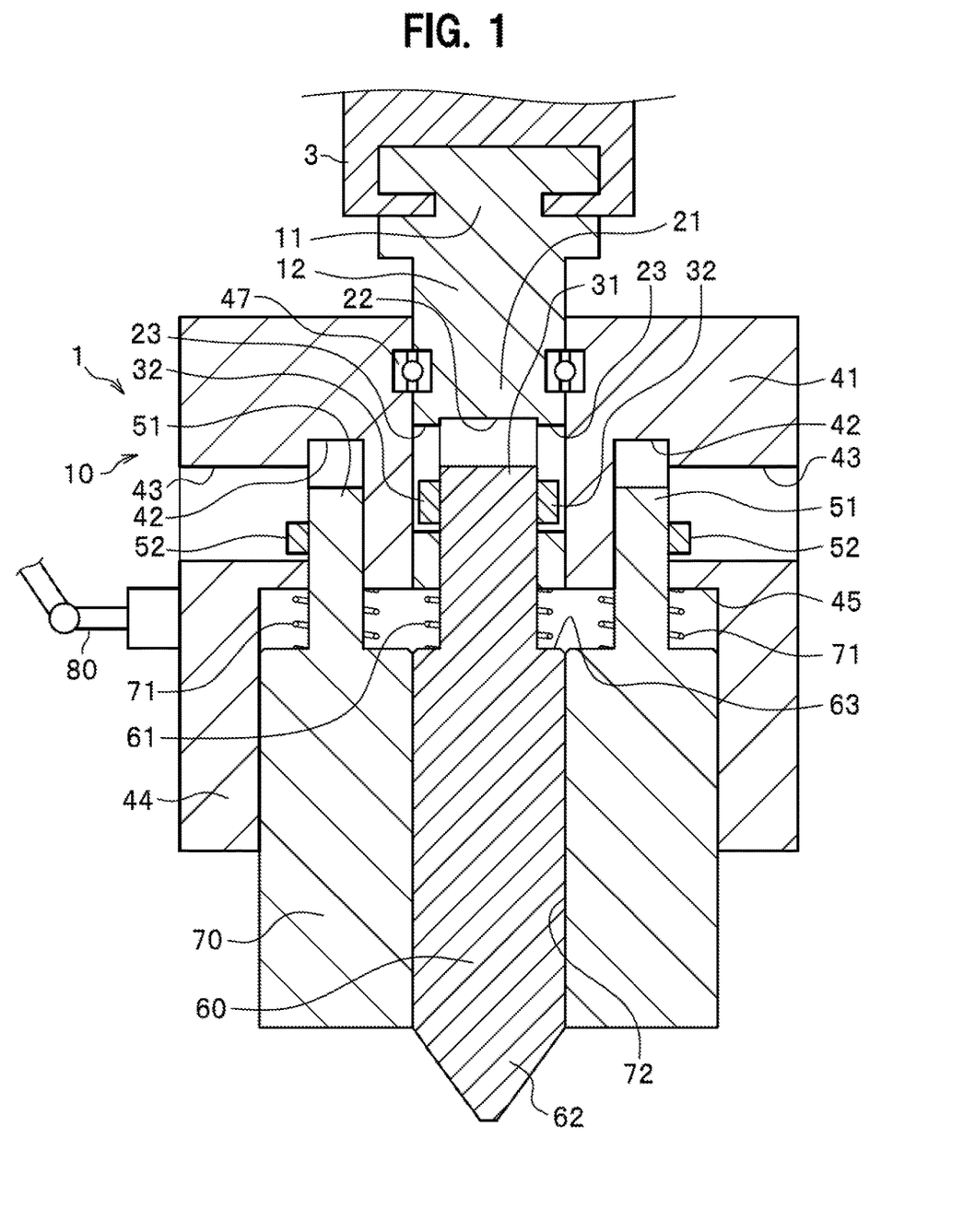
FIG. 1 is a cross-sectional view showing a rotary tool according to an embodiment of the present invention.

First, a configuration of a rotary tool according to this embodiment will be described. As shown in FIG. 1, a rotary tool 1 according to this embodiment is used in a joining device that performs friction stir welding of a joint member 2 (see FIG. 5), and is inserted into a butted part of the joint member 2 while rotating. The rotary tool 1 includes a main body 10, a stirring pin 60, a shoulder 70, a first elastic member 61, and a second elastic member 71. The rotary tool 1 also includes a retainer 80.

<Main Body>

The main body 10 is a part fixed to a joining device 3 such as a machining center, for example, and includes a fixed unit 11 and a rotary shaft 12. The fixed unit 11 is a part that is attached and secured to the joining device 3 and has a cylindrical shape. The fixed unit 11 is a chuck mechanism and can be detachably fixed to the joining device by cooperating with a chuck mechanism to be paired therewith, which is provided in the joining device 3. Examples of the chuck mechanism include grooves provided in the fixed unit 11 and claws provided in the joining device 3 that fit into the grooves on the fixed unit 11 to clamp the fixed unit 11. The rotary shaft 12 is connected to the other end side (lower side in FIG. 1) of the fixed unit 11 that is attached to the joining device 3. The rotary shaft 12 has a cylindrical shape. The rotary shaft 12 is a part that transmits a rotary force from the joining device 3 to the stirring pin 60, and is connected to a rotary shaft (not shown) of the joining device 3 via the fixed unit 11.

Figure 2:
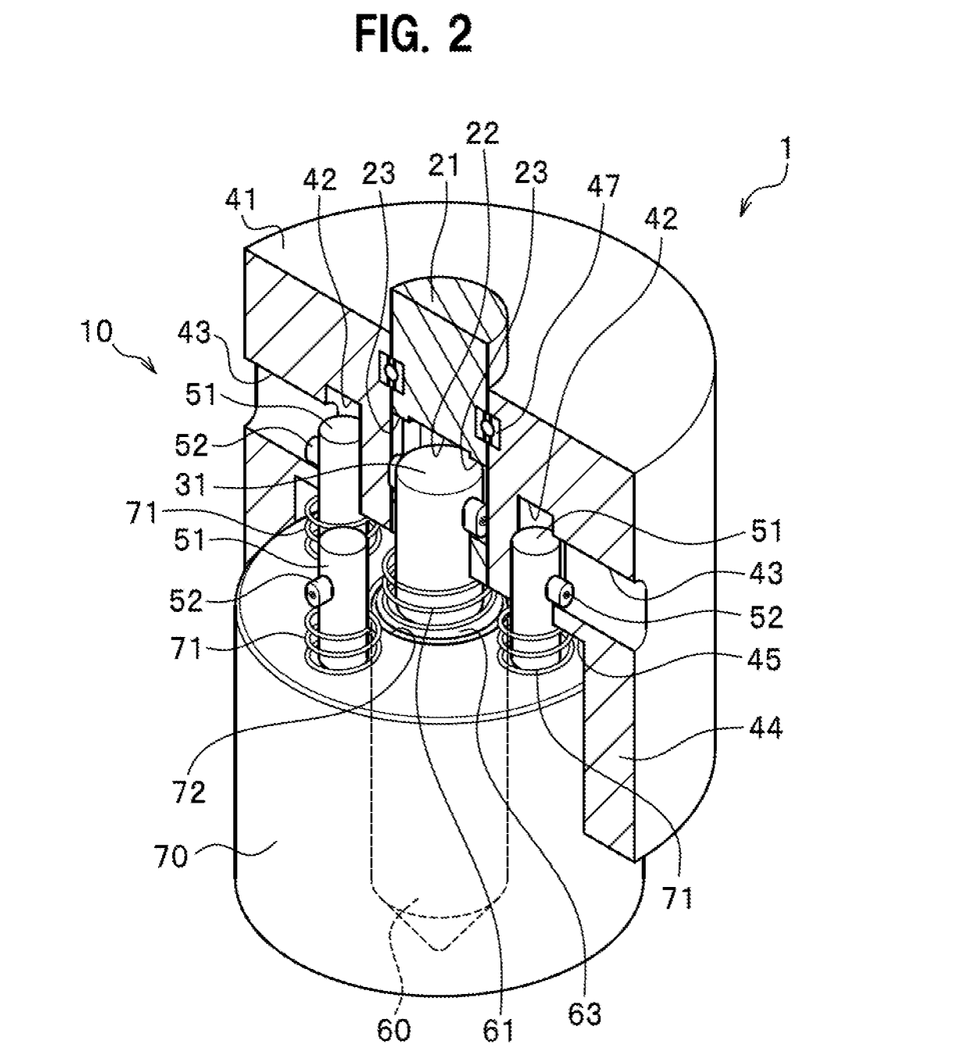
FIG. 2 is a partially broken perspective view showing the rotary tool according to the embodiment.
Figure 3:
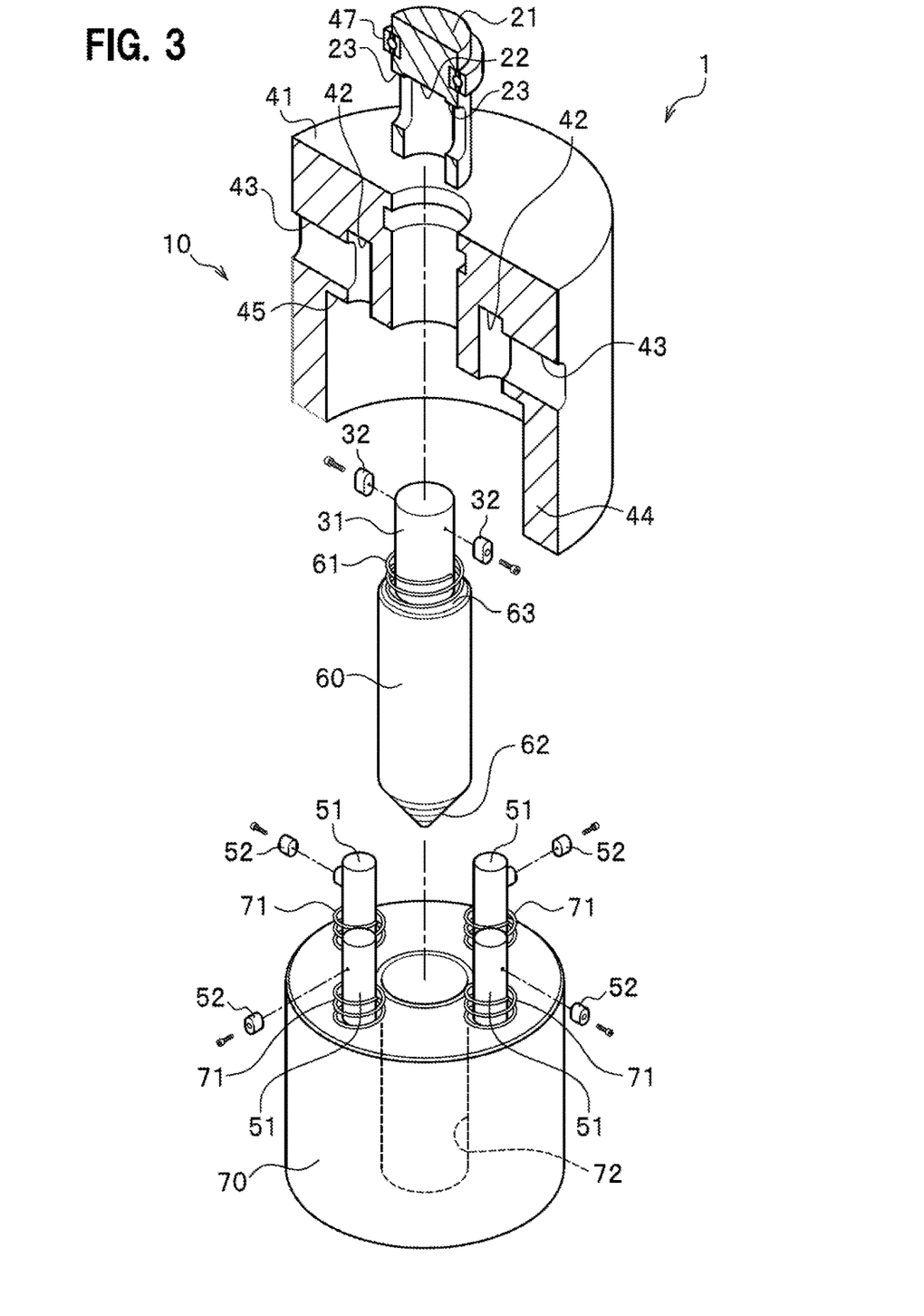
FIG. 3 is a partially broken exploded perspective view showing the rotary tool according to the embodiment.

As shown in FIGS. 2 and 3, the main body 10 further includes a first holder 21, a first slide shaft 31, a second holder 41, and a second slide shaft 51.

<First Holder>

The first holder 21 is a part that is attached to the rotary shaft 12, rotates synchronously with the rotary shaft 12, and supports the stirring pin 60. The first holder 21 has a bottomed cylindrical shape and has a first housing recess 22 formed therein, into which the first slide shaft 31 is inserted. The first housing recess 22 has a columnar shape and opens toward the stirring pin 60 (lower side in FIG. 1). A key groove 23 is formed in a cylinder barrel portion of the first holder 21 (outer peripheral edge of the first housing recess 22). The key groove 23 is formed in an oval shape that is elongated along an axial direction of the rotary shaft 12 (vertical direction in FIG. 1), and penetrates from the outer peripheral surface to the inner peripheral surface of the first holder 21. The key groove 23 may not penetrate the cylinder barrel portion, and may be formed in the shape of a groove on the inner peripheral surface of the cylinder barrel portion. The key grooves 23 are arranged at 180° intervals in the circumferential direction of the cylinder barrel portion and are formed at two locations facing each other. The number of the key grooves 23 is not limited to two, and may be one or greater than or equal to three.

<First Slide Shaft>

The first slide shaft 31 is a part that is housed in the first housing recess 22 at a center portion of the first holder 21 so as to be slidable in the axial direction of the rotary shaft (vertical direction in FIG. 1) and that rotates synchronously (co-rotates) with the first holder 21. The first slide shaft 31 has a cylindrical shape and has an outside diameter that allows to be housed in the first housing recess 22. A key 32 projecting outward is provided on the outer peripheral surface of the first slide shaft 31. The key 32 is fixed at a position corresponding to the key groove 23 at the base end portion of the first slide shaft 31 (back end of the first housing recess 22: upper end portion in FIG. 1) and is inserted into the key groove 23. The key 32 has an oval shape that is long in the axial direction of the rotary shaft, has the same width as the key groove 23, and has a length shorter than that of the key groove 23 in the longitudinal direction. That is, the key 32 fits in the key groove 23 in the width direction and is movable in the longitudinal direction. Note that the shape of the key 32 is not limited to the oval shape but may be any other shape such as a circle, an ellipse, an oblong ellipse, and a rectangle as long as the shape has the same width as the key groove 23. The stirring pin 60 is integrally provided at the distal end portion of the first slide shaft 31 (end portion on the side away from the joining device 3: lower end portion in FIG. 1). Therefore, the stirring pin 60 is biased toward the distal-end side by the first elastic member 61 and is thus biased toward the distal-end side of the first slide shaft 31.

<Second Holder>

The second holder 41 is a cylindrical part provided relatively rotatably on the outer periphery of the first holder 21 and supports the shoulder 70. A bearing 47 is interposed between the second holder 41 and the rotary shaft 12. The bearing 47 is arranged so as to surround the rotary shaft 12. Thus, the second holder 41 is provided so as to be rotatable relative to the rotary shaft 12. Since the first holder 21 and the second holder 41 are relatively rotatable, the first holder 21 is rotatable inside the second holder 41. The cylinder barrel portion of the second holder 41 is formed thicker than that of the first holder 21. A plurality of second housing recesses 42 are formed in the cylinder barrel portion of the second holder 41, into which the second slide shaft 51 is inserted. In this embodiment, the second housing recesses 42 are formed at four locations at intervals of 90° in the circumferential direction of the cylinder barrel portion. The second housing recess 42 has a columnar shape and opens toward the shoulder 70 (lower side in FIG. 1). A key groove 43 is formed in the outer peripheral edge of the second housing recess 42. The key groove 43 is formed in an oval shape that is elongated along the axial direction of the rotary shaft 12 (vertical direction in FIG. 1) and penetrates from the inner peripheral surface of the second housing recess 42 to the outer peripheral surface of the second holder 41. Note that the key groove 43 may not penetrate but may be formed in the shape of a groove on the inner peripheral surface of the second housing recess 42. The key groove 43 is formed at one location on the outer peripheral surface of the cylinder barrel portion of the second holder 41 in each of the second housing recesses 42. The number of the second housing recesses 42 is not limited to four, and may be one, two, or greater than or equal to five.

A skirt portion 44 that covers the outer periphery of the shoulder 70 is formed in the lower part of the second holder 41. Inside the skirt portion 44, a shoulder housing recess 45 is formed in which the stirring pin 60 and the upper part of the shoulder 70 are housed. The inner bottom surface (upper end surface in FIG. 1) of the shoulder housing recess 45 is flush with the distal-end face of the first holder 21. Note that the inner bottom surface (upper end surface in FIG. 1) of the shoulder housing recess 45 and the distal-end face of the first holder 21 do not have to be flush with each other.

<Second Slide Shaft>

The second slide shaft 51 is a part that is housed in the second housing recess 42 of the second holder 41 so as to be slidable in the axial direction of the rotary shaft. The second slide shaft 51 has a cylindrical shape and has an outside diameter that allows to be housed in the second housing recess 42. A key 52 projecting outward is provided on the outer peripheral surface of the second slide shaft 51. The key 52 is fixed at a position corresponding to the key groove 43 at the end portion of the second slide shaft 51 (back end portion of the second housing recess 42: upper end portion in FIG. 1) and is inserted into the key groove 43. The key 52 has an oval shape that is long in the axial direction of the rotary shaft, has the same width as the key groove 43, and has a length shorter than that of the key groove 43 in the longitudinal direction. That is, the key 52 fits in the key groove 43 in the width direction and is movable in the longitudinal direction. The key 52 can be fixed to the side surface of the second slide shaft 51 by being inserted from the outside of the key groove 43 with the second slide shaft 51 being inserted into the second housing recess 42. The shape of the key 52 is not limited to the oval shape but may be any other shape such as a circle, an ellipse, an oblong ellipse, and a rectangle as long as the shape has the same width as the key groove 43. The shoulder 70 is integrally provided at the distal end portion of the second slide shaft 51 (end portion on the side away from the joining device 3: lower end portion in FIG. 1).

<Stirring Pin>

The stirring pin 60 is a part that receives a rotary force from the main body 10 and that is inserted into the joint member while rotating to perform friction stirring on the joint member. The stirring pin 60 is made of, for example, tool steel and has a cylindrical shape. A distal end portion 62 (lower end portion in FIG. 1) of the stirring pin 60 tapers toward its tip. The tip of the distal end portion 62 of the stirring pin has a flat surface perpendicular to the axial direction. The stirring pin 60 is formed integrally with the first slide shaft 31 and moves in the axial direction of the rotary shaft as the first slide shaft 31 slides. The stirring pin 60 has a diameter larger than that of the first slide shaft 31, and a ring-shaped step portion 63 in planar view is formed at the connection (base end portion of the stirring pin 60) between the stirring pin 60 and the first slide shaft 31.

<First Elastic Member>

The first elastic member 61 is a part that biases the stirring pin toward the distal-end side with respect to the axial direction of the rotary shaft. The first elastic member 61 is made of a coil spring, for example, and is arranged so as to surround the outer peripheral surface of the lower part of the first slide shaft 31. The first elastic member 61 is mounted between the step portion 63 of the stirring pin 60 and the distal end of the first holder 21. The first elastic member 61 can bias the stirring pin toward the distal end side against the force received from the stirring pin 60.

The elasticity of the first elastic member 61 is set such that the stirring pin 60 is displaced and inserted within a predetermined range within the entire movable range of the stirring pin 60 by the first elastic member 61 (movable length of the key 32 in the key groove 23) when the stirring pin 60 is inserted with a predetermined pressing load into the joint member made of at least one selected from aluminum, copper, magnesium, and an alloy thereof. For example, when the first elastic member 61 is a coil spring and the load applied to the first elastic member 61 is 100 kg to 5 t, the stirring pin 60 is set to be inserted into the joint member in a state where the first elastic member 61 is deformed with the deflection amount within the range of 0 to 30% of the free length of the first elastic member 61. Thus, even when the height of the joint member 2 changes as the stirring pin 60 is pushed into the joint member 2 at a given height, the insertion amount of the stirring pin 60 is easily kept constant by deforming the first elastic member 61 according to the change in the joint member 2.

Note that the first elastic member 61 is not limited to the coil spring, but may be a metal spring such as a plate spring or disc spring, or a polymer elastic member (elastomer) such as rubber, polymer resin, or sponge-like resin. The first elastic member 61 may also be a fluid spring using air pressure, gas pressure, or hydraulic pressure, or a magnetic spring using magnetic force or electromagnetic force.

The first elastic member may be set so as to satisfy the relationship between deformation and elasticity when the stirring pin 60 is inserted to a predetermined depth, taking into account joining conditions. The joining conditions that affect the setting of the first elastic member include, for example, conditions of a joining member such as the material of the joint member and the shape of the joint portion as well as joining conditions such as the insertion depth of the stirring pin 60, the shape of the rotary tool, a rotation speed, and a moving speed.

<Shoulder>

The shoulder 70 is a part that presses the joint member while in contact with the joint member. The shoulder 70 is formed separately from the stirring pin 60 and is connected to the main body 10 so as to be movable in the axial direction of the rotary shaft independently of the stirring pin 60. The shoulder 70 is made of tool steel, for example. The shoulder 70 has a cylindrical shape and is coaxially arranged so as to surround the stirring pin 60. That is, the stirring pin 60 is inserted into a hollow portion 72 of the shoulder 70. The stirring pin 60 is rotatable and axially movable relative to the shoulder 70. The distal end face of the shoulder 70 is flush with the base end portion of the tapered surface of the distal end portion 62 of the stirring pin 60. That is, the distal end portion 62 of the stirring pin 60 protrudes from the distal end face of the shoulder 70 toward the distal-end side. In other words, the stirring pin 60 protrudes downward from a bottom surface 73 of the shoulder. The shoulder 70 is formed integrally with the second slide shaft 51 and moves in the axial direction of the rotary shaft as the second slide shaft 51 slides. The second slide shaft 51 is connected to the base end surface of the shoulder 70 (surface facing the second housing recess 42 of the second holder 41) and protrudes toward the second housing recess 42. The second slide shafts 51 are connected to the base end surface of the shoulder 70 at four locations at a pitch of 90° (see FIG. 3). The number of the second slide shafts 51 is not limited to four, and may be one, two, three, or greater than or equal to five as long as the number thereof corresponds to that of the second housing recesses 42.

As described above, since the second slide shaft 51 formed integrally with the shoulder 70 is inserted into the second housing recess 42 of the second holder 41, the shoulder rotates synchronously with the second holder 41.

<Second Elastic Member>

The second elastic member 71 is a part that biases the shoulder 70 toward the distal-end side in the axial direction of the rotary shaft. As in the case of the first elastic member 61, the second elastic member 71 is made of a coil spring, for example. The second elastic member 71 is arranged so as to wrap around the lower part of the second slide shaft 51. The second elastic member 71 is mounted between the base end surface of the shoulder 70 and the inner bottom surface of the shoulder housing recess 45 of the second holder 41. The second elastic member 71 can bias the shoulder 70 toward the distal-end side against the force received from the shoulder 70.

The elasticity of the second elastic member 71 is set such that the shoulder 70 is displaced to press the joint member 2 within a predetermined range within the entire movable range of the stirring pin 60 by the second elastic member 71 (movable length of the key 52 in the key groove 43) when the stirring pin 60 is inserted with a predetermined pressing load into the joint member made of at least one selected from aluminum, copper, magnesium, and an alloy thereof. For example, when the second elastic member 71 is a coil spring and the load applied to the second elastic member 71 is 50 kg to 2 t, the shoulder 70 is set to press the joint member 2 in a state where the second elastic member 71 is deformed with the deflection amount within the range of 0 to 30% of the free length of the second elastic member 71. Thus, the joint member is easily pressed by the shoulder 70 without the shoulder 70 being inserted into the joint member 2 in a state where the shoulder 70 is in contact with the joint member 2. The second elastic member 71 deforms more easily than the first elastic member 61.

Note that the second elastic member 71 is not limited to the coil spring, as in the case of the first elastic member 61, but may be a metal spring such as a plate spring or disc spring, or a polymer elastic member (elastomer) such as rubber, polymer resin, or sponge-like resin. The second elastic member 71 may also be a fluid spring using air pressure, gas pressure, or hydraulic pressure, or a magnetic spring using magnetic force or electromagnetic force.

With the joining conditions taken into account, the second elastic member 71 may be set so as to satisfy the relationship between deformation and elasticity, which allows the shoulder 70 pressed against the joint member 2 to press the joint member 2 without being inserted into the joint member 2 while in contact with the joint member 2. The joining conditions that affect the setting of the second elastic member 71 include, for example, the conditions of the joining member such as the material of the joint member 2 and the shape of the joint portion as well as joining conditions such as the insertion depth of the stirring pin 60, the shape of the rotary tool 1, the rotation speed, and the moving speed. The shoulder 70 may at least partially come into contact with the joint member 2, and there may be some space between the shoulder 70 and the joint member 2 depending on the relationship with the surface shape of the joint member 2. It is preferable that the shoulder 70 comes into contact with the joint member 2 without a gap so that the metal material overflowing during friction stir welding can be suppressed to prevent the generation of burrs. Although the shoulder 70 may be inserted into the joint member 2 to some extent, it is preferable that the shoulder 70 is not deeply inserted into the joint member 2 so as to prevent the formation of a dent due to the contact between the joint member 2 and the shoulder 70 after the joint.

<Retainer>

As shown in FIG. 1, the retainer 80 is a rod-shaped arm member and has its distal end secured to the outer peripheral surface of the second holder 41. The retainer 80 has its base end portion connected to a fixing system of the joining device 3 so as to retain the second holder 41 in a non-rotating state. This retainer 80 is included in the rotary tool 1. The second holder 41 and the shoulder 70 are provided so as to be rotatable relative to the rotary shaft 12, the first holder 21, and the stirring pin 60, and are also retained in a non-rotating state by the retainer 80. Thus, even when the stirring pin 60 rotates, the shoulder 70 can be retained in the non-rotating state.

2. Joining Device

Next, a configuration of the joining device 3 including the rotary tool 1 having the configuration described above will be described. The joining device 3 includes: a power unit (not shown) that outputs a rotary force to be transmitted to the rotary shaft 12 of the rotary tool 1; and a position controller (not shown) that carries out position control of the rotary tool by holding the fixed unit 11 of the rotary tool 1. The joining device 3 includes a machining center that carries out position control, for example, and the position controller includes a CPU and the like to move the rotary tool 1 by operating the power unit based on position information inputted in advance. The power unit moves the rotary tool 1 in three axial directions of XYZ.

3. Joining Method

Next, a joining method according to the present invention will be described with reference to FIGS. 4 and 5. In the joining method, friction stir welding is performed on the joint member 2 by moving the rotary tool 1 according to this embodiment to be in a preset predetermined height position with respect to the joint member 2, and inserting the stirring pin 60 of the rotary tool 1 in rotation into the joint member 2 while pressing the shoulder 70 of the rotary tool 1 against the joint member 2.

Figure 4A:
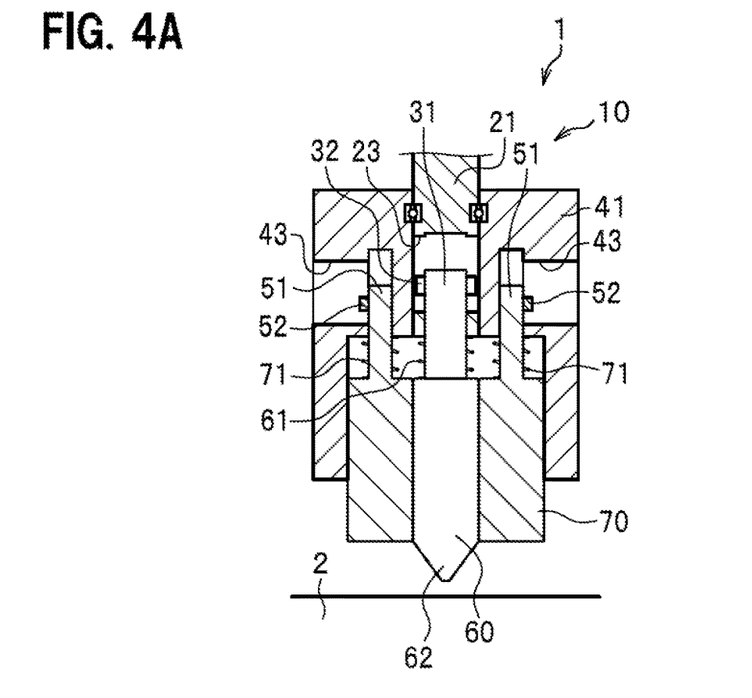
FIG. 4A is a cross-sectional view showing an operation of each part of the rotary tool according to the embodiment at the start of friction stir welding, and showing a state before the distal end of a stirring pin comes into contact with a joint member.
Figure 4B:
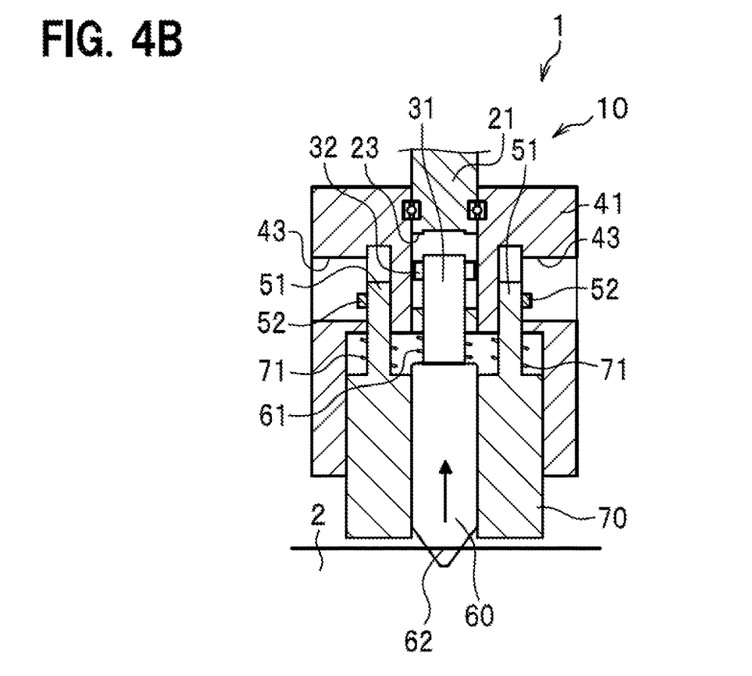
FIG. 4B is a cross-sectional view showing the operation of each part of the rotary tool according to the embodiment at the start of friction stir welding, and showing a state where the distal end of the stirring pin is in contact with the joint member.

When inserting the stirring pin 60, as shown in FIGS. 4A and 4B, the distal end of the stirring pin 60 first comes into contact with the joint member 2 as the rotary tool 1 approaches the joint member 2 in the insertion direction. When the rotary tool 1 further approaches the joint member 2, the first elastic member 61 is compressed, thereby inserting the stirring pin 60 into the joint member 2 while increasing the elastic force of the first elastic member 61 that biases the stirring pin 60 toward the joint member 2. Thus, the joining is performed by bringing the rotary tool 1 closer to the joint member 2 in the insertion direction until the stirring pin 60 is inserted into the joint member 2 to a desired depth. In this event, the first elastic member 61 is set such that the first elastic member 61 is not completely deformed and the stirring pin 60 can be inserted into the joint member 2 in a state where an excess force is left due to the deformation of the first elastic member 61.

Figure 4C:
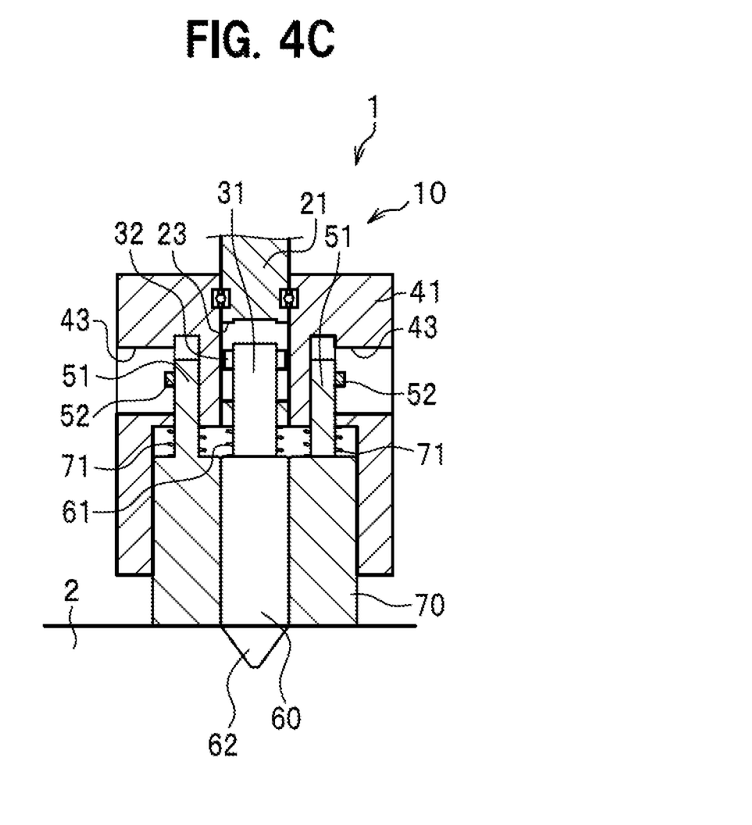
FIG. 4C is a cross-sectional view showing the operation of each part of the rotary tool according to the embodiment at the start of friction stir welding, and showing a state where a shoulder is in contact with the joint member.

As shown in FIG. 4C, when the rotary tool 1 is further brought closer to the joint member 2, the shoulder 70 comes into contact with the joint member 2. As the second elastic member 71 is compressed, the shoulder 70 is pressed against the joint member 2 while increasing the elastic force of the second elastic member 71 that biases the shoulder 70 toward the joint member 2. In this event, the elastic force of the second elastic member 71 is set such that the second elastic member 71 is not completely deformed and the shoulder 70 can be pressed against the joint member 2 in a state where an excess force is left due to the deformation of the second elastic member 71. In addition, the second elastic member 71 is set so that the shoulder 70 can press the joint member 2 without being inserted into the joint member 2 while in contact with the joint member 2.

Figure 5:
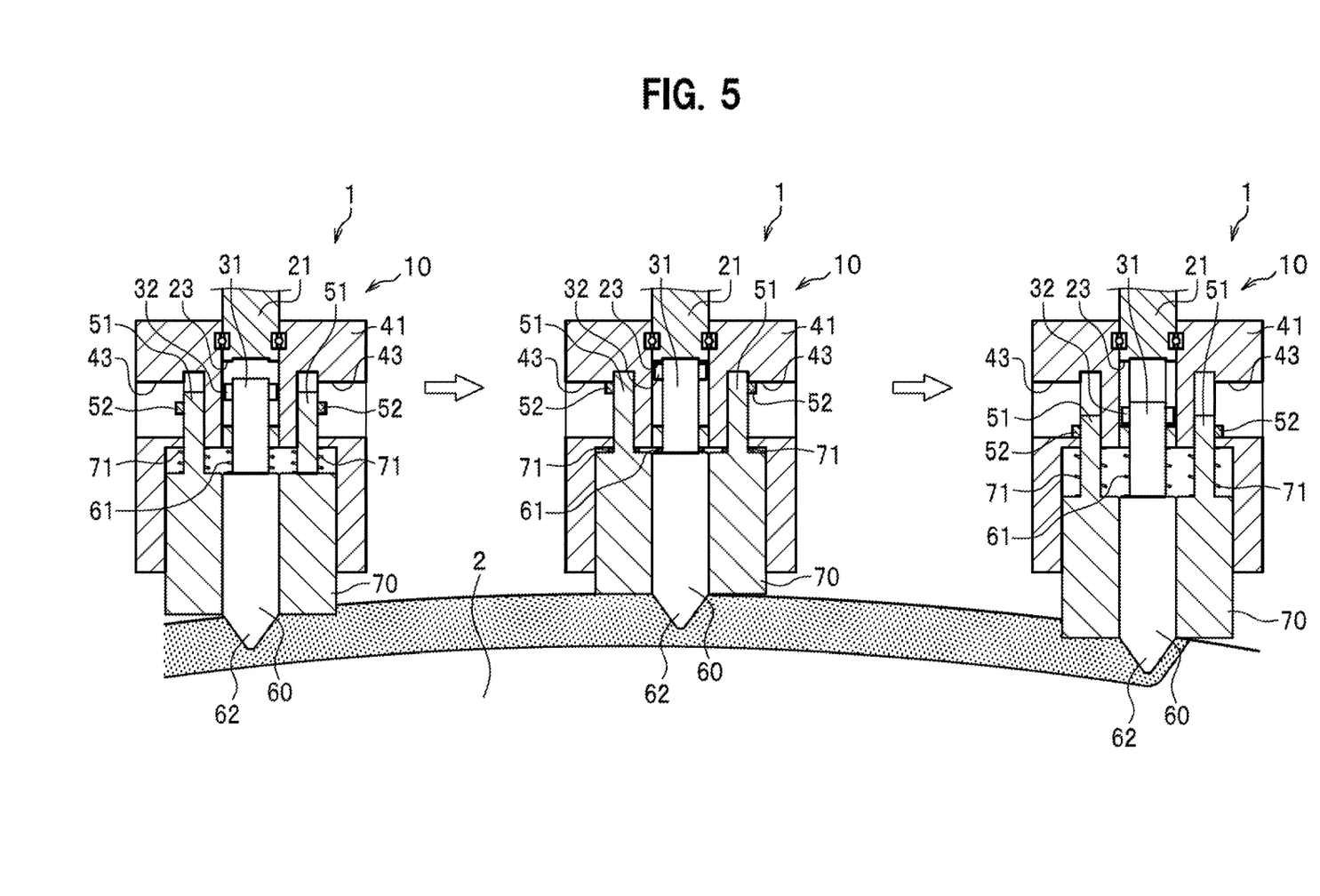
FIG. 5 is a cross-sectional view showing an operation of each part of the rotary tool according to the embodiment during the friction stir welding.

During joining with the rotary tool 1, as shown in the left part of FIG. 5, the stirring pin 60 is biased toward the distal end by the first elastic member 61 and the shoulder 70 is biased toward the distal end by the second elastic member 71. Thus, when there is no error in the height of the joint member 2 with respect to the set value, as shown in the left part of FIG. 5, the distal end portion 62 of the stirring pin 60 is inserted into the joint member 2 to a desired depth. The shoulder 70 can press the joint member 2 without being inserted into the joint member 2 while in contact with the joint member.

Next, as shown in the center of FIG. 5, description is given of a case where the height of the joint member 2 is slightly higher than the set value due to an error during the friction stir welding. Here, if there is no first elastic member 61 and the stirring pin 60 is pushed directly into the joint member 2, the insertion amount of the stirring pin 60 increases with an increase in the height of the joint member 2, as compared with the case where there is no error in the height of the joint member 2 with respect to the set value. On the other hand, when joining is performed with the rotary tool 1 according to this embodiment, as the height of the joint member 2 is increased, the stirring pin 60 is pushed up by an upward reaction force received from the joint member 2. At the same time, the first elastic member 61 is compressed by this push-up, and the stirring pin is pushed down by a downward elastic force received from the first elastic member 61. The position of the stirring pin 60 is changed to a position where the upward reaction force and the downward elastic force caused by such a change in height of the joint member 2 are balanced. The first elastic member 61 is set so that the insertion amount of the stirring pin 60 in this event is approximately the same as the insertion amount when there is no error in the height of the joint member 2 with respect to the set value. If the elastic force of the first elastic member 61 is too weak, the upward reaction force due to the change in height of the joint member 2 increases, resulting in a reduction in the insertion amount. On the other hand, if the elastic force of the first elastic member 61 is too strong, the downward elastic force due to the change in height of the joint member 2 increases, resulting in an increase in the insertion amount. More specifically, even when the height of the joint member 2 changes and increases, the first elastic member 61 is set in the rotary tool 1 so that the stirring pin 60 is inserted into the joint member 2 to a desired depth set in accordance with the set value of the height of the joint member 2.

Here, if there is no second elastic member 71 and the shoulder 70 is pushed directly into the joint member 2, the insertion amount of the shoulder 70 increases with an increase in the height of the joint member 2, as compared with the case where there is no error in the height of the joint member 2 with respect to the set value. On the other hand, when joining is performed with the rotary tool 1 according to this embodiment, as the height of the joint member 2 is increased, the shoulder 70 is pushed up by an upward reaction force received from the joint member 2. At the same time, the second elastic member 71 is compressed by this push-up, and the shoulder 70 is pushed down by a downward elastic force received from the second elastic member 71. The position of the shoulder 70 is thus changed to a position where the upward reaction force and the downward elastic force caused by the change in height of the joint member 2 are balanced. The second elastic member 71 is set so that the shoulder 70 in this event is pressed in the same manner as the case where there is no error in the height of the joint member 2 with respect to the set value. If the elastic force of the second elastic member 71 is too weak, the upward reaction force due to the change in insertion depth increases, resulting in insufficient pressing. As a result, the shoulder 70 can no longer suppress the generation of burrs. Also, if the elastic force of the second elastic member 71 is too weak, the upward reaction force due to the change in height of the joint member 2 increases, resulting in insufficient pressing, which leads to a defect in the joint. On the other hand, if the elastic force of the second elastic member 71 is too strong, the downward elastic force due to the change in height of the joint member 2 increases, resulting in an increase in the insertion amount. As a result, the shoulder 70 is inserted into the joint member 2. More specifically, the second elastic member 71 is set in the rotary tool 1 so that, even when the height of the joint member 2 changes, the shoulder 70 presses the joint member 2 without being inserted into the joint member 2 while in contact with the joint member 2.

When the height of the joint member 2 becomes lower than the set value, as shown in the right part of FIG. 5, the first elastic member 61 stretches and the stirring pin 60 descends, while the second elastic member 71 stretches and the shoulder 70 descends. Thus, even when the height of the joint member 2 changes and becomes lower, the first elastic member 61 is set in the rotary tool 1 so that the stirring pin 60 is inserted into the joint member 2 to a desired depth set in accordance with the set value of the height of the joint member 2. Moreover, even when the height of the joint member 2 changes and becomes lower, the second elastic member 71 is set in the rotary tool 1 so as to press the joint member 2 without being inserted into the joint member 2 while in contact with the joint member 2.

Then, at a position for pulling out the stirring pin, the shoulder 70 is first separated from the joint member 2 as the rotary tool 1 is moved away from the joint member 2. As the rotary tool 1 is moved further away from the joint member 2, the insertion amount of the stirring pin 60 is gradually reduced. When the rotary tool 1 is moved even further away from the joint member 2, the stirring pin 60 is separated from the joint member 2.

As described above, in the rotary tool 1, the stirring pin 60 is inserted into the joint member 2 to a certain depth by the action of the first elastic member 61. Thus, a plasticized region is formed at a certain depth. Therefore, stable joining quality can be achieved. Further, in the rotary tool 1, the friction stirring is performed by inserting the stirring pin 60 into the joint member 2 while maintaining the state where the shoulder 70 presses the joint member 2 by the action of the second elastic member 71. Thus, the shoulder 70 can press the metal material overflowing from the insertion site of the stirring pin 60 due to the friction stirring with the stirring pin 60. Therefore, the generation of burrs can be reduced.

4. Advantageous Effects

According to the rotary tool 1, the joining device 3, and the joining method according to this embodiment, the stirring pin 60 provided so as to be movable in the axial direction of the rotary shaft 12 is biased toward the distal-end side by the first elastic member 61, and thus the stirring pin 60 is inserted to a predetermined depth according to the elasticity of the first elastic member 61 when the distal end portion 62 of the stirring pin 60 is inserted into the joint member 2. By setting the first elastic member 61 in consideration of the joining conditions such as the joining member and joining mode, the stirring pin 60 can be inserted to a desired depth. More specifically, the rotary tool 1 can perform simulative load control using the first elastic member 61.

When a rotary tool having no elastic member is attached to a joining device such as a machining center, for example, that can only perform position control, a support height of the rotary tool 1 is kept constant based on a value set by the machining center, and the insertion position of the stirring pin 60 is kept approximately constant. On the other hand, when the rotary tool 1 according to this embodiment is used, even when the support height of the rotary tool 1 by the machining center is constant, the first elastic member 61 stretches according to the height of the joint member 2 and the stirring pin 60 moves in the axial direction. Thus, by utilizing the elasticity of the first elastic member 61, the load control can be performed by controlling the insertion depth of the stirring pin 60 into the joint member 2.

The rotary tool 1 includes the shoulder 70 that is arranged so as to be movable independently of the stirring pin 60 with respect to the axial direction of the rotary shaft 12 without receiving a rotary force from the main body (rotary shaft 12), and presses the joint member 2. The generation of burrs can be reduced by the shoulder 70 pressing the metal material overflowing from the insertion site of the stirring pin 60 due to friction stirring with the stirring pin 60. Thus, the shoulder 70 provides a good surface finish after friction stir welding.

The rotary tool 1 includes the second elastic member 71 that biases the shoulder 70 toward the distal-end side. Thus, the load control of the shoulder 70 can also be realized by the second elastic member 71. As a result, the surface finish is further improved after the friction stir welding.

The main body 10 further includes the cylindrical first holder 21 and the first slide shaft 31 that is housed in the center portion of the first holder 21 so as to be slidable in the axial direction of the rotary shaft and that rotates synchronously with the first holder 21. The stirring pin 60 is provided at the distal end of the first slide shaft 31. Thus, the stirring pin 60 can slide in the axial direction of the rotary shaft while transmitting the rotary force from the main body 10 to the stirring pin 60.

In the rotary tool 1, the first elastic member 61 is arranged so as to surround the lower part of the first slide shaft 31. Thus, the first elastic member 61 is positioned near the intermediate portion between the first slide shaft 31 and the stirring pin, and the first elastic member 61 acts on the first slide shaft 31 evenly in the circumferential direction. Therefore, even when the first slide shaft 31 moves, the first elastic member 61 stably biases the stirring pin 60 toward the distal-end side. Accordingly, the first elastic member 61 can be easily provided, and the precision of the load control of the stirring pin 60 can be improved.

In the rotary tool 1, the first elastic member 61 is housed in the first holder 21 and arranged between the base end portion of the first slide shaft 31 and a portion of the first holder 21 on a side of the fixed unit. Thus, the first elastic member 61 is positioned near the intermediate portion between the first slide shaft 31 and the stirring pin 60, and the first holder 21 can receive the force that the first elastic member 61 receives from the stirring pin 60. Therefore, even when the first slide shaft 31 moves, the first elastic member 61 stably biases the stirring pin 60 toward the distal-end side. Thus, the precision of the load control of the stirring pin 60 can be improved.

The key groove 23 is formed in the first holder 21 and the key 32 is formed on the first slide shaft 31. Thus, the first slide shaft 31 and the stirring pin 60 rotate synchronously with the rotation of the rotary shaft 12 and the first holder 21, and allow axial movement in a stable state. Therefore, the operation of the stirring pin 60 is further stabilized.

Furthermore, the main body 10 has the second holder 41 and the second slide shaft 51. The shoulder 70 can rotate relative to the first holder 21 and the rotary shaft 12, and can stably slide in the axial direction of the rotary shaft 12 in a non-rotating state.

The shoulder 70 has a cylindrical shape, the stirring pin 60 is inserted into the hollow portion 72 of the shoulder 70, and the distal end portion 62 of the stirring pin 60 protrudes downward from the bottom surface of the shoulder 70. Thus, the stirring pin 60 can rotate stably inside the shoulder 70, and the bottom surface of the shoulder 70 can press the periphery of the friction stirring region.

The rotary tool 1 includes the retainer 80 that retains the shoulder 70 in a non-rotating state. Thus, the shoulder 70 can be more easily retained in the non-rotating state, and the surface finish of the joint member 2 is further improved after the friction stir welding.

In the rotary tool 1, the first elastic member 61 is preferably an elastic member that imparts elastic force by at least one selected from a solid spring, a fluid spring, magnetic force, and electromagnetic force. Such a configuration makes it easier to adjust the elasticity of the first elastic member 61.

The joining device 3 includes the rotary tool 1, the power unit, and the position controller. The joining device 3 performs the friction stir welding of the joint member 2 with the position controller by moving the rotary tool 1 to be in a predetermined height position with respect to the joint member 2 and inserting the stirring pin 60 of the rotary tool 1 into the joint member 2 while pressing the shoulder 70 of the rotary tool 1 against the joint member 2. According to the joining device 3, by utilizing the elasticity of the first elastic member 61, the friction stir welding can be performed while performing load control for controlling the insertion depth of the stirring pin 60 into the joint member 2. In addition, the shoulder 70 presses the metal material overflowing from the insertion site of the stirring pin 60 due to the friction stirring with the stirring pin 60, thereby reducing the generation of burrs and improving the surface finish after the friction stir welding.

In the joining method described above, the friction stir welding of the joint member 2 is performed by moving the rotary tool 1 to be in a predetermined height position with respect to the joint member 2, and inserting the stirring pin 60 in rotation into the joint member 2 while pressing the shoulder 70 against the joint member 2. According to the joining method, by utilizing the elasticity of the first elastic member 61, the friction stir welding can be performed while performing the load control for controlling the insertion depth of the stirring pin 60 into the joint member 2. In addition, the shoulder 70 presses the metal material overflowing from the insertion site of the stirring pin 60 due to the friction stirring with the stirring pin 60, thereby reducing the generation of burrs and improving the surface finish after the friction stir welding.

As described above, according to the rotary tool 1, the joining device 3, and the joining method, the load control can be performed even when mounted to the machining center that performs position control only.

5. Modified Example

Figure 6:
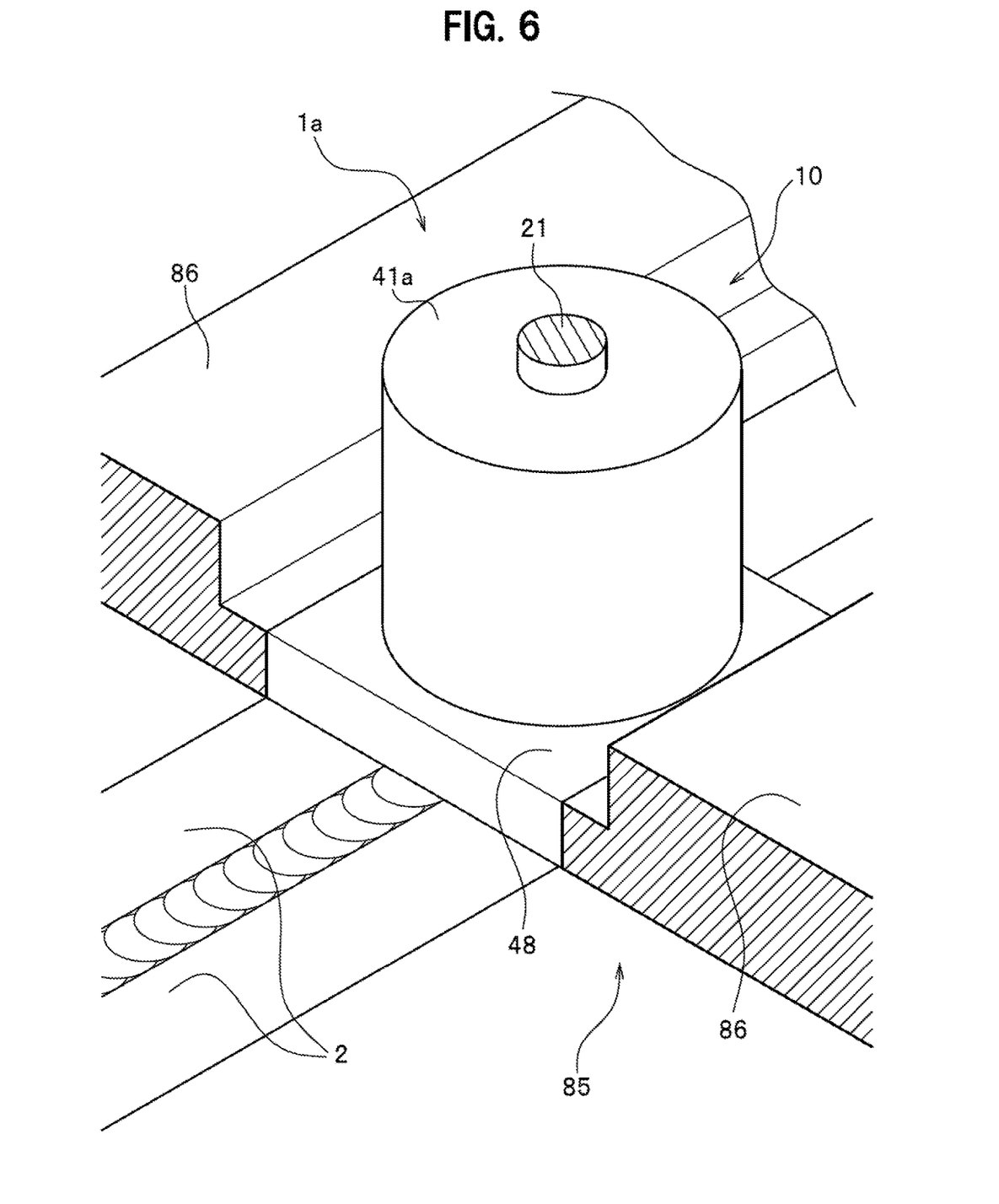
FIG. 6 is a partially broken perspective view showing a modified example of the rotary tool according to the embodiment.

Next, a modified example of the retainer will be described with reference to FIG. 6. A retainer 85 according to the modified example may have a configuration, as shown in FIG. 6, in which a rectangular portion 48 having a rectangular outer shape is provided at a lower end of a second holder 41a and guide members 86 are provided along the movement locus of a rotary tool 1a. The guide members 86 are made of long members, and are arranged on both sides of the rectangular portion 48 of the second holder 41a with a space substantially the same as the width of the rectangular portion 48 so as to sandwich the rectangular portion 48 from both sides. The guide members 86 are a retainer included in a joining device 3. The second holder 41a configured as described above moves along the movement locus without rotating while having the outer peripheral surface of the rectangular portion 48 slide on the side surfaces of the guide members 86. Inside the second holder 41a, a stirring pin 60, a first holder 21, and a bearing are inserted as in the case of the second holder 41 shown in FIG. 1. Other configurations are the same as those of the rotary tool 1 shown in FIG. 1, and thus are denoted by the same reference numerals and description thereof will be omitted.

6. Others

Although the embodiment of the present invention has been described above, the design can be changed as appropriate within the scope of the gist of the present invention. In the above embodiment, the key groove 23 is formed in the first holder 21 and the key 32 is formed in the first slide shaft 31, but the present invention is not limited thereto. A key may be formed on the first holder 21 and a key groove may be formed in the first slide shaft 31. The same applies to the second holder 41 and the second slide shaft 51. The positional relationship between the key and the key groove may be reversed so that the key is formed on the second holder 41 and the key groove is formed in the second slide shaft 51. In such a case, the same effects as those of the above-described embodiment can also be achieved.

Further, in the above embodiment, the rotary tool 1 includes the retainer 80 fixed to the second holder 41, and the retainer is connected to the joining device 3 to retain the shoulder 70 in a non-rotating state. However, the present invention is not limited thereto. For example, the joining device 3 may include a rod-shaped arm member fixed to the fixing system of the joining device 3 as a second retainer, and this second retainer may be connected to the second holder 41 of the rotary tool 1 to retain the shoulder 70 in the non-rotating state. The second retainer is included in the joining device 3. Alternatively, the rotary tool 1 may include a rod-shaped arm member fixed to the second holder 41 as the retainer 80, the joining device 3 may include a rod-shaped arm member fixed to the fixing system of the joining device 3 as the second retainer, and the both retainers may be connected to each other to retain the shoulder 70 in the non-rotating state. These retainers are included in the rotary tool 1 and the joining device 3, respectively. Thus, the retainer included in the rotary tool 1 and the second retainer that is included in the joining device 3 and operates in cooperation with the retainer included in the rotary tool 1 may be provided at the same time. The fixing unit, as the retainer 80, may have any other shape such as the rod-shaped arm member (included in the rotary tool 1) fixed to the shoulder 70 and the rod-shaped arm member (included in the joining device 3) connecting the fixing system of the joint device 3 and the shoulder 70. As described above, since the joining device 3 includes the second retainer that retains the shoulder 70 in the non-rotating state, the shoulder 70 can be easily retained in the non-rotating state. Thus, the surface finish of the joint member 2 is further improved after the friction stir welding.

Furthermore, in the above embodiment, the first elastic member 61 is arranged so as to surround the lower part of the first slide shaft 31 and is provided between the lower end of the first holder 21 and the step portion 63 of the stirring pin 60. However, the present invention is not limited thereto. The first elastic member 61 may be arranged at any position as long as the first elastic member biases the stirring pin 60 toward the distal-end side. For example, the first elastic member 61 may be housed in the first holder 21 and mounted between the base end portion of the first slide shaft 31 and a portion of the first holder on a side of the fixed unit (between the base end portion of the first slide shaft 31 and the inner bottom portion of the first housing recess 22).

Likewise, the second elastic member 71 may also be mounted between the base end portion of the second slide shaft 51 and the inner bottom surface of the second housing recess 42. At the upper end portion of the first slide shaft 31, a columnar extension portion is formed, which extends toward the upper end portion. The first elastic member 61 may be mounted so as to surround the extension portion of the first slide shaft 31 between the first slide shaft 31 and a portion of the first holder 21 on a side of the fixed unit. In this event, the extension portion may be formed to have a diameter smaller than that of the first slide shaft 31 according to the inside diameter of the first holder 21. In such a case, the same effects as those of the above-described embodiment can also be achieved.

In the above embodiment, the distal end portion 62 of the stirring pin 60 protrudes downward from the bottom surface of the shoulder 70. However, the present invention is not limited thereto. In the rotary tool 1, the bottom surface of the shoulder 70 may protrude below the distal end portion 62 of the stirring pin 60 while not in contact with the joint member 2. As a result, when the rotary tool 1 is pulled out of the joint member 2, the stirring pin 60 is separated from the joint member 2 before the shoulder 70 is separated in a state where the shoulder 70 is pressing the joint member 2 as the rotary tool 1 is moved away from the joint member 2. In this event, by pulling out the stirring pin 60 while maintaining the state where the shoulder 70 presses the joint member 2, the shoulder 70 can hold down the metal material overflowing due to the insertion of the stirring pin 60. Therefore, the metal material held down by the shoulder 70 can be easily filled in a hole created when the stirring pin 60 is pulled out. Particularly, when friction stir welding is performed at a spot where the rotary tool 1 is inserted and pulled out without being moved from the insertion position during friction stir welding, the formation of a hole can be easily prevented.

REFERENCE SIGNS LIST

1 rotary tool
2 joint member
3 joining device
10 main body
11 fixed unit
12 rotary shaft
21 first holder
23 key groove
31 first slide shaft
32 key
41 second holder
43 key groove
51 second slide shaft
52 key
60 stirring pin
61 first elastic member
70 shoulder
71 second elastic member
80 retainer
85 second retainer

The invention claimed is:

1. A rotary tool used in a joining device that performs friction stir welding of a joint member, the rotary tool comprising:
    a main body having a fixed unit attached and secured to the joining device, and a rotary shaft for transmitting a rotary force from the joining device;
    a stirring pin that is arranged on the main body so as to be rotatable by receiving the rotary force from the main body and to be movable relative to an axial direction of the rotary shaft, and that is inserted into the joint member to perform friction stirring on the joint member;
    a shoulder that is formed separately from the stirring pin, that is arranged on the main body so as not to receive the rotary force from the main body but to be movable separately from the stirring pin relative to the axial direction of the rotary shaft, and that presses the joint member while in contact with the joint member; and
    a first elastic member that biases the stirring pin toward a distal-end side relative to the axial direction of the rotary shaft.

2. The rotary tool according to claim 1, further comprising:
    a second elastic member that biases the shoulder toward the distal-end side relative to the axial direction of the rotary shaft.

3. The rotary tool according to claim 2, wherein
    the main body further includes a cylindrical first holder attached to the rotary shaft and a first slide shaft that is housed in a center portion of the first holder so as to be slidable in the axial direction of the rotary shaft and that rotates synchronously with the first holder,
    the stirring pin is provided at a distal end of the first slide shaft, and
    the first slide shaft is biased toward the distal-end side of the stirring pin via the first elastic member.

4. The rotary tool according to claim 3, wherein
    the first elastic member is arranged so as to surround a lower part of the first slide shaft.

5. The rotary tool according to claim 3, wherein
    the first elastic member is housed inside the first holder and arranged between a base end portion of the first slide shaft and a portion of the first holder on a side of the fixed unit.

6. The rotary tool according to claim 3, wherein
    a key groove elongated in the axial direction of the rotary shaft is formed on one of the first holder and the first slide shaft, and a key is formed on the other one of the first holder and the first slide shaft so as to extend in a direction intersecting with the axial direction of the rotary shaft and fit into the key groove,
    the key moves inside the key groove along the axial direction of the rotary shaft as the first slide shaft moves in the axial direction of the rotary shaft, and
    the key and the key groove come into contact with each other in a circumferential direction as the first holder rotates, and thus the first holder and the first slide shaft rotate synchronously.

7. The rotary tool according to claim 3, wherein
    the main body further includes a cylindrical second holder provided to be relatively rotatable on an outer circumference of the first holder, and a second slide shaft housed inside the second holder so as to be slidable in the axial direction of the rotary shaft,
    the shoulder is provided at a distal end of the second slide shaft, and
    the second slide shaft is biased toward the distal-end side of the shoulder via the second elastic member.

8. The rotary tool according to claim 1, wherein
    the shoulder has a cylindrical shape, and
    the stirring pin is inserted into the shoulder and protrudes downward from a bottom surface of the shoulder.

9. The rotary tool according to claim 1, further comprising:
    a retainer that retains the shoulder in a non-rotating state.

10. The rotary tool according to claim 1, wherein
the first elastic member is an elastic member that imparts elastic force by at least one selected from a solid spring, a fluid spring, magnetic force, and electromagnetic force.

11. A joining device including the rotary tool according to claim 1, the joining device comprising:
a power unit that outputs the rotary force to be transmitted to the rotary shaft of the rotary tool; and
a position controller that performs position control of the rotary tool by holding the fixed unit of the rotary tool, wherein
friction stir welding is performed on the joint member by moving the rotary tool to be in a predetermined height position with respect to the joint member by the position controller and inserting the stirring pin of the rotary tool into the joint member while pressing the shoulder of the rotary tool against the joint member.

12. The joining device according to claim 11, further comprising:
a second retainer that retains the shoulder in a non-rotating state.

13. A joining method comprising:
performing friction stir welding on the joint member by moving the rotary tool according to claim 1 to be in a predetermined height position with respect to the joint member and inserting the rotating stirring pin into the joint member while pressing the shoulder against the joint member.

* * * * *